No. 752,744. Patented February 23, 1904.

UNITED STATES PATENT OFFICE.

NICHOLAS ZELINSKY, OF MOSCOW, RUSSIA.

PROCESS OF MAKING ORGANIC ACIDS.

SPECIFICATION forming part of Letters Patent No. 752,744, dated February 23, 1904.

Application filed December 26, 1902. Serial No. 136,698. (No specimens.)

*To all whom it may concern:*

Be it known that I, NICHOLAS ZELINSKY, a subject of the Emperor of Russia, and a resident of Moscow, Russia, (whose post-office address is Moscow, University,) have invented certain new and useful Improvements in Processes of Producing Organic Acids, of which the following is a specification.

From my published papers it is known that the bromo and iodo substituted products of the synthetic cyclic hydrocarbons when in presence of ether easily react with magnesium and yield metallo-organic compositions of the general formula: $CnH_{2-1}MgBr(T)+ether$. These latter reacting on carbonic acid and setting or binding it are converted into complex combinations or compounds having the formula $CnH_{2-1}COOMgBr(T)+ether$, which complex combinations when being decomposed by aqueous solutions of metallic acids yield the corresponding organic fatty acids. Bromin and iodin, and especially the synthetic hydrocarbons, however, present so dear and valuable an initial product that it proves impossible to employ them for technical purposes with the view of obtaining the terminal products of reaction—*i. e.*, fatty acids—as the technical production ought to be as cheap as possible.

The object of this invention consists in a process by which the bromin and iodin are allowed to be replaced by the cheaper chlorin and the hydrocarbons of synthetic nature by fractions of natural petroleum or earth-oil, which, as it is known, presents a mixture of cyclic and open-chain hydrocarbons.

The hereinafter-described process of producing acids with technically-profitable yields (up to sixty per centum of the theoretical yield) from the respective fractions of petroleum cannot be denied to be a new and important improvement in the petroleum industry, considering that by this process possibility is afforded to produce on a technical scale a large series of acids and, furthermore, to utilize the acids thus obtained as initial material for the synthesis of substances and bodies of the fatty (schacic) series (by combining these acids with glycerin) for complex ethers, as also in the soap manufacture. By this process an accessible and cheap product, as petroleum, is or may be converted into chemical compositions of very high value and of the greatest importance in the technical industry.

By taking as initial matter a petroleum fraction, for instance, boiling at 115° to 120° a product is obtained, after chlorination, boiling at a temperature of 157° to 170° and consisting of a mixture of chlorids:

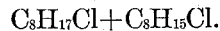

$$C_8H_{17}Cl + C_8H_{15}Cl.$$

By successively introducing in the reaction magnesium and carbonic acid from the chlorids are obtained the corresponding saturated acids: $C_8H_{17}COOH + C_8H_{15}COOH$. The reaction is performed in the following manner: The mixture of the chlorids is dissolved in three to four volumes of ether free from water, whereafter magnesium is introduced in the state of dry powder, (one atom or arc molecule of the chlorid, in the case given, forty-eight grams of magnesium or two hundred and ninety-five grams of chlorid.) In order to push the beginning of the reaction, it is advisable to add a very small quantity of iodin (0.1 to 0.3 gram) or to pass during a short time a jet of dry hydrochloric-acid gas into the ether solution. The reaction that begins almost at once is performed in a very regular manner, lasting from one to two hours, depending on the amount of chlorid employed, whereby but a small portion of the magnesium does not react. Then in the same apparatus containing the reactive product of magnesium dry carbonic acid is passed, under cooling, on the chlorid. The carbonic acid acts immediately developing considerable heat. By aid of a reflex cooler the greatest part of the ether is retained in the apparatus, while the carbonic acid satuated with ether and not absorbed is caused to enter the following apparatus for the purpose of a similar reaction. After one or two hours the whole contents of the apparatus are converted into a semisolid mass of complex magnesium organic compositions. After distillation of the greatest portion of the ether the semisolid mass of the reaction products is led for decomposition into a vessel, which contains slightly-acidulated muriatic or sulfuric acid. The magnesium salt of the organic acids which is formed remains in the aqueous solution, while in the ether solution are the neutral products of reaction. The aqueous solution of the magnesium salts of acids is separated from the ether layer by means of a cock provided in the bottom of the vessel, which has the form of a large separatory funnel, and is then decomposed by the excess of muriatic or sulfuric acid. The chlorinated organic salts are, with the view of further refining, converted into salts and ether or submitted to fractional distillation in a vacuum.

In the example stated the whole or entire product (sixty per centum of theoretical yield) is distilled under pressure of twelve millimeters between 128° and 132°, representing a mixture of the acids of the following composition: First, $C_8H_{17}COOH$, and, second, $C_8H_{15}COOH$. The former is isomeric with the normal romylic (pelargoric) acid and the second with the hexahydroxylylic acid. As monobasic acids the same are characterized by a series of derivates—viz., chlorids, ethers, and salts.

I have found that from petroleum fractions 80° to 85° and 100° to 105° may be obtained in good yields fatty acids of cyclic structure of the composition $C_7H_{12}O_2$ with a boiling temperature 121° to 122°, and $C_8H_{14}O_2$ with a boiling temperature 129° to 130° under pressure of twelve millimeters.

The production of organic acids and of their derivates from petroleum is reduced, according to the process described, to the following: One or other fraction of petroleum is transformed into chlorid, which is dissolved in ether, and in the product of reaction resulting from the solution and magnesium is introduced when cooling carbonic acid. The complex magnesium organic compounds that are formed are successively decomposed by water and muriatic or sulfuric acid. The eliminated organic acids, independent of their nature, are subjected to further refining, to the distillation in vacuum, this being sufficient for the purpose of combining them with glycerin, (producing fats,) of converting into corresponding salts or other derivates which are characteristic for the given acid.

Examples of the products obtained by means of using certain mineral-oil fractions are the following:

1. From Russian naphtha-gasolene, boiling-point 28° to 40°, specific gravity $$a(26°) = 0.6266$$

that part of the obtained chlorid boiling between 80° to 100° is treated according to the previously-described process, and there results mostly isocaproic acid, boiling-point 197° to 198°, specific gravity, $$a(18°/4°) = 0.9290,$$

according to the constants: beta methyl ethyl propionic acid, $C_6H_{12}O_2$.

2. From petan "kahlbaum," boiling-point 27° to 29°, specific gravity, $$a(14.5°/4°) = 0.6238$$

there is obtained mostly $C_5H_{11}Cl$ with the boiling-point 94° to 96°, and from the latter, according to this process, likewise isocaproic acid, boiling-point 196°, specific gravity $$a(18°/4°) = 0.9288.$$

3. From naphtha-benzin, boiling-point 80° to 82°, specific gravity, $a(19°) = 0.745$ to $0.750$ there is obtained a chlorid boiling at 141° to 143°. From the latter is obtained, according to this process, hexa hydro benzoic acid, boiling-point 231° to 232°, of such a purity that it congeals in the cold in crystalline form. The crystals melt at 29° to 30°.

4. From naphtha-benzin, boiling-point 71° to 79°, specific gravity, $a(20°) = 0.7297$, which, judging by its boiling-point, contains hexan, methyl-pentamethylen and hexa methylen, there is obtained accordingly a chlorid prepared as a mixture of the derivates of said three hydrocarbons. While that portion of the chlorid boiling at 140° to 143° yields, according to this process, almost exclusively hexa hydro-benzoic acid, the chlorid boiling at 130° to 140° yields a mixture of the following acids, heptylic acid ($C_7H_{14}O_2$), methyl cyclopentan carbonic acid, and cyclo hexan carbonic acid (hexa hydro-benzoic acid) $C_7H_{12}O_2$, with a boiling-point of the mixture at 216° to 225°.

I claim as new and of my invention—

The herein-described process of producing organic acids from natural petroleum and its fractions which consists in chlorinating the said petroleum and then subjecting the same to the successive action of magnesium and carbonic acid, substantially as described.

In witness whereof I have hereunto set my hand in presence of two witnesses.

NICHOLAS ZELINSKY.

Witnesses:
NAUM MINTZ,
GUSTAV HARTION.